MOON & TURNER.
Bee Hive.
No. 81,398.
Patented Aug. 25, 1868.
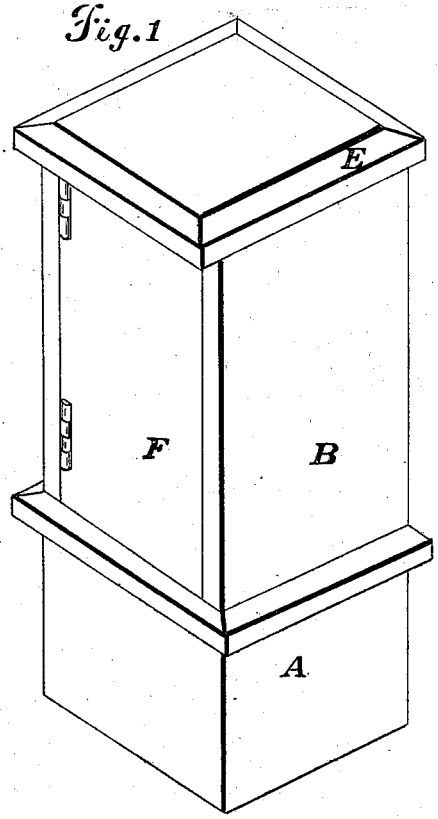
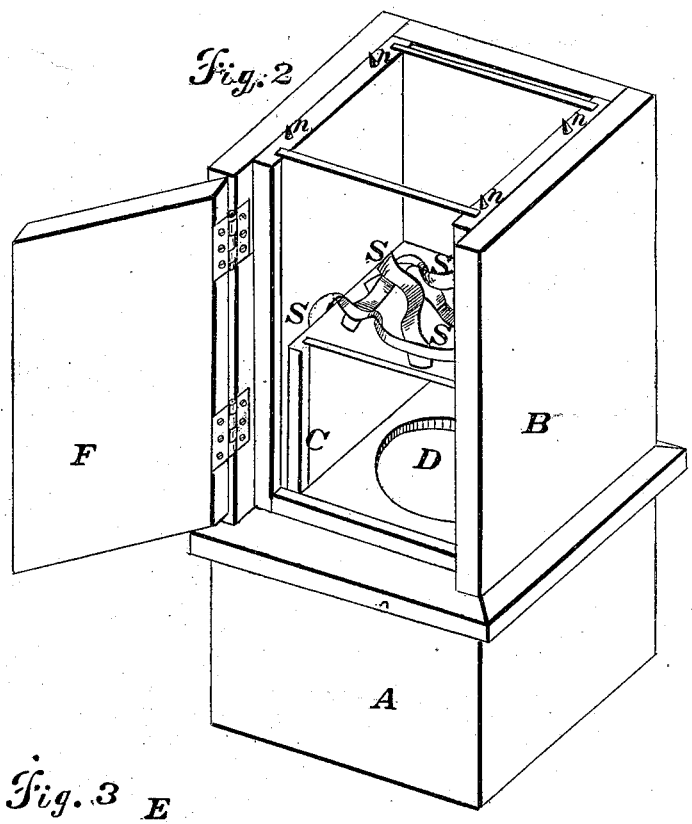
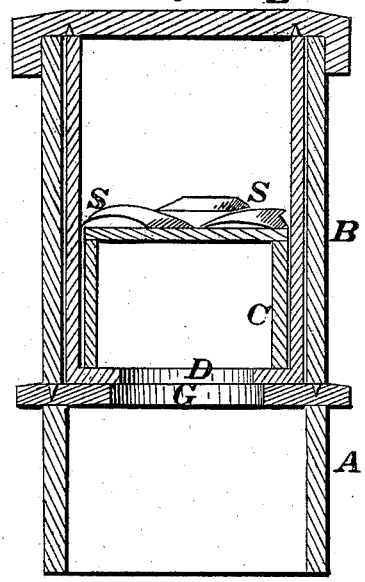

United States Patent Office.

HIRAM MOON AND DEWITT C. TURNER, OF RED CREEK, NEW YORK.

Letters Patent No. 81,398, dated August 25, 1868; antedated August 21, 1868.

IMPROVEMENT IN SURPLUS-HONEY BOXES IN BEE-HIVES.

The Schedule referred to in these Letters Patent and making part of the same.

TO ALL WHOM IT MAY CONCERN:

Be it known that we, HIRAM MOON and DEWITT C. TURNER, of Red Creek, in the county of Wayne, and State of New York, have invented certain new and useful Improvements in Surplus-Honey Boxes; and we do hereby declare that the following is a full, clear, and exact description thereof, reference being had to the accompanying drawings, and to the letters of reference marked thereon, which form a part of this specification, in which—

Figure 1 represents a perspective view of our hive, and the adjustable box attached to it.

Figure 2 is a perspective of same with door opened, so as to give a view of the honey-case within.

Figure 3 is a vertical section of the hive and honey-case within it.

The nature of our invention consists in constructing an adjustable surplus-honey case with strings attached to it, for the purpose of elevating it to any desired height in the adjustable box.

The letter A designates the bee-hive, and B the adjustable box, when in position. In the honey-board of hive A, a circular opening, G, is made, which corresponds with opening D, as seen in fig. 2.

C represents the honey-case, which is made to fit inside of box B. To two opposite sides of case C, the strings S are attached, for the purpose of raising or lowering the said case, as may be required. When the case C is at the desired elevation, it will be held in position by pressing strings S down on points n, (see fig. 2.)

It will be observed that the honey-case C will be furnished with a pane or panes of glass, to enable the bee-master to observe the working of the bees.

E represents an adjustable cap, fitting on the top of box B. The box B is furnished with the door F, which, when opened, will enable the observer to inspect the operation of the bees in honey-case C.

We claim the following advantages for our mode of constructing surplus-honey cases:

First, the large opening G in the honey-board, the object of which is to induce the bees to cluster in said opening, as they are prone to do, for the purpose of protecting the comb from the ravages of the moth. When collected as above represented, if facilities are afforded them to extend their comb upward, they will immediately renew their labor to effect that object. As soon as case C, which will rest on the honey-board G, is filled with comb, a knife must be passed under case C, and thus separate the comb in case C from that in the opening G. The case C can now be raised higher in box B, by means of strings S, so as to supply the bees with additional space to continue their labor.

By this arrangement, we secure the labor of the bees at the season when the purest and best honey is made, which is the season of the white-clover bloom. We are enabled to get surplus honey during the swarming-season.

Having thus described our invention, what we claim, and desire to secure by Letters Patent, is—

1. The adjustable honey-case C, when constructed as and for the purpose set forth.
2. The case C, in combination with adjustable box B and hive A, when constructed substantially as described.

In testimony that we claim the foregoing as our own, we affix our signatures in presence of two witnesses.

HIRAM MOON,
DEWITT C. TURNER.

Witnesses:
T. H. ALEXANDER,
D. C. WASHBURN.